C. R. GETHER.
CLUTCH MECHANISM.
APPLICATION FILED MAR. 30, 1909.
923,965.
Patented June 8, 1909.
2 SHEETS—SHEET 1.
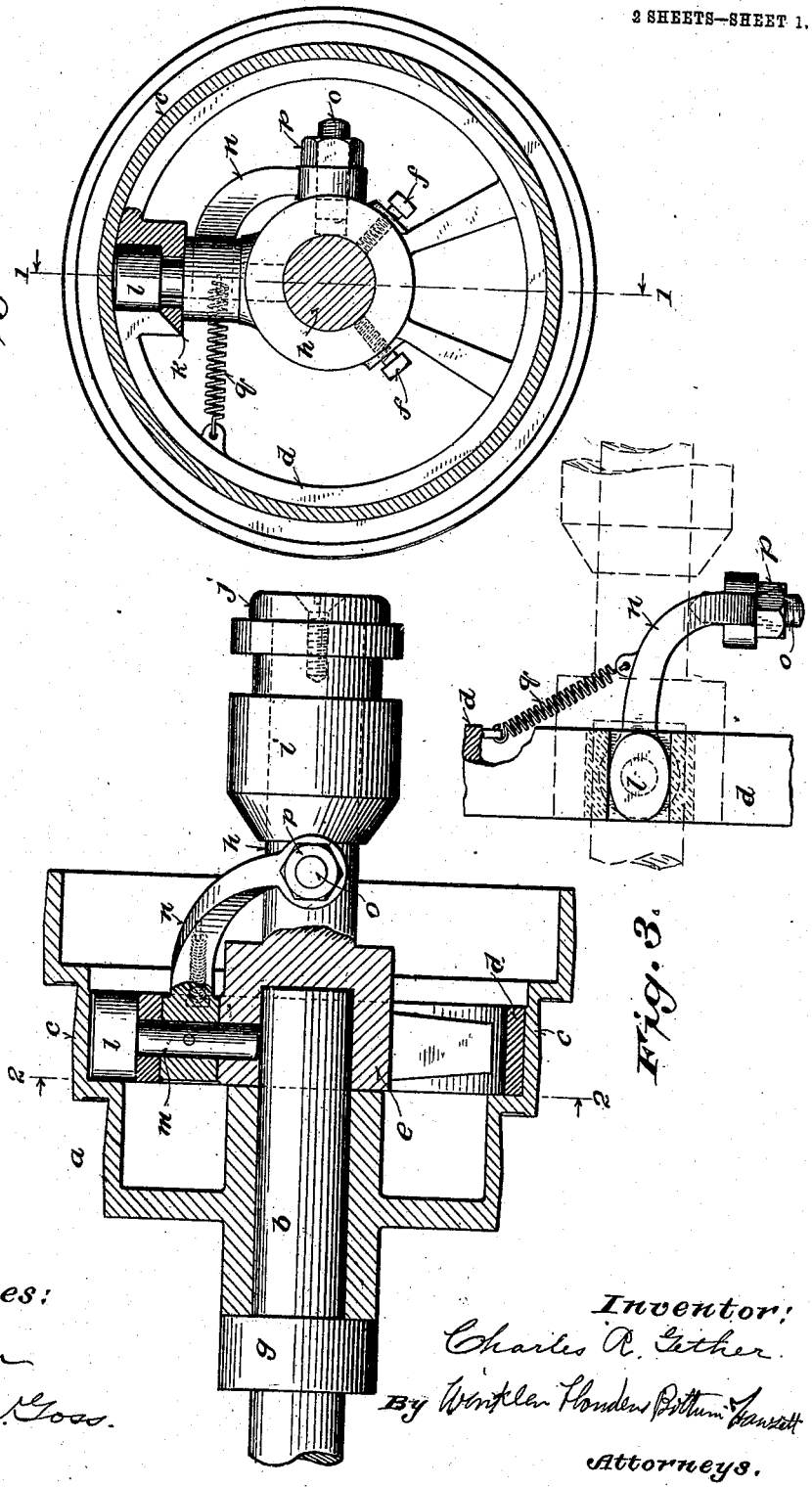

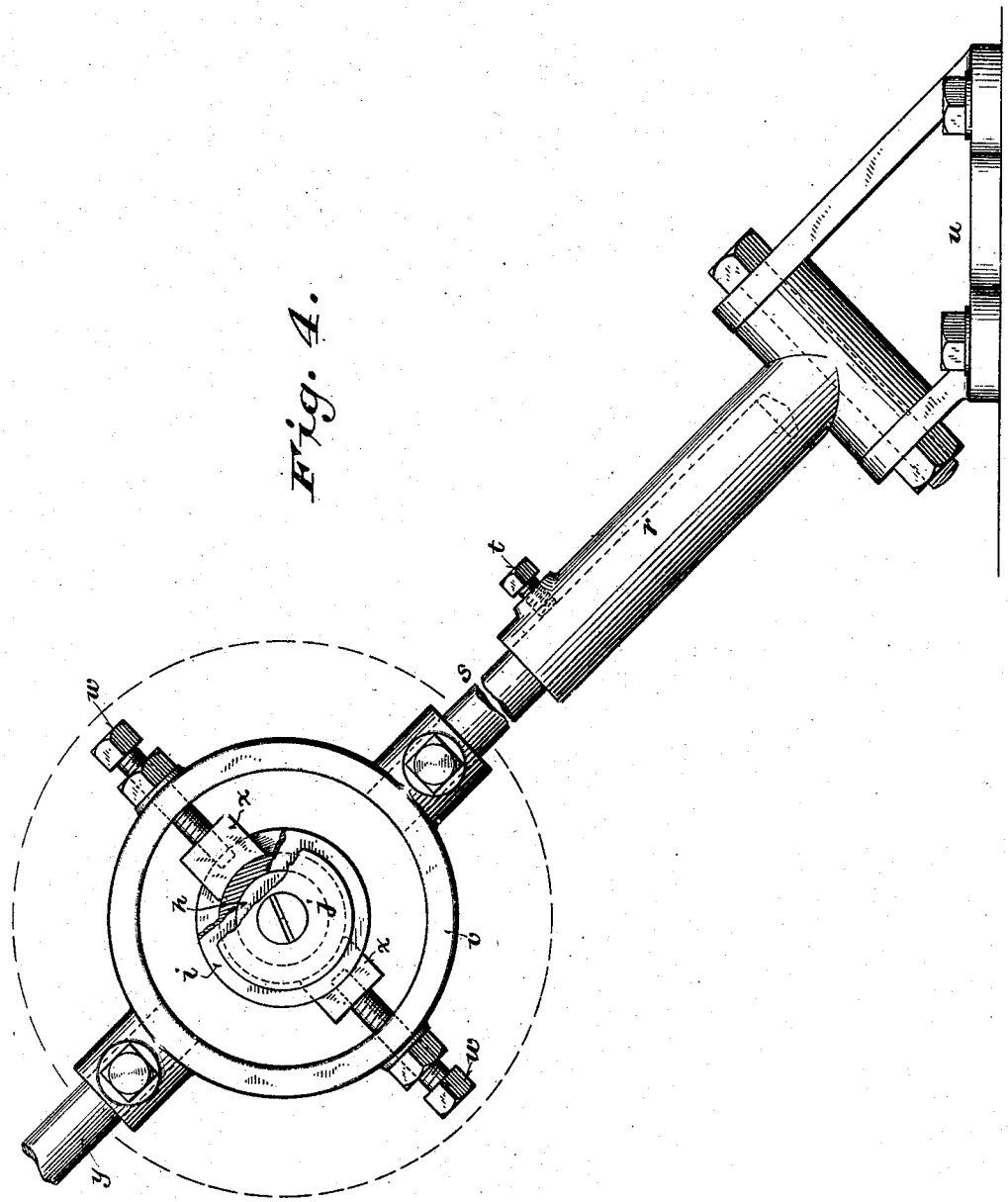

UNITED STATES PATENT OFFICE.

CHARLES R. GETHER, OF MILWAUKEE, WISCONSIN.

CLUTCH MECHANISM.

No. 923,965.      Specification of Letters Patent.      Patented June 8, 1909.

Application filed March 30, 1909.   Serial No. 486,733.

*To all whom it may concern:*

Be it known that I, CHARLES R. GETHER, a citizen of the United States, residing at Milwaukee, in the county of Milwaukee and State of Wisconsin, have invented certain new and useful Improvements in Clutch Mechanism, of which the following is a specification, reference being had to the accompanying drawing, forming a part thereof.

The main objects of this invention are to provide a clutch attachment which can be readily applied to printing presses and other machines the main shafts of which project a short distance from their driving pulleys or wheels; to readily adapt a clutch operating lever for attachment to the floor or foundation on which such machines stand to clutches at different distances from the floor or foundation; to take the weight of the lever off from the clutch shaft or spindle; and generally to improve the construction and operation of devices of this class.

It consists in certain novel features of construction and in the peculiar arrangement and combination of parts as hereinafter particularly described and pointed out in the claims.

In the accompanying drawing like characters designate the same parts in the several figures.

Figure 1 is an axial section on the line 1 1, Fig. 2, of clutch mechanism embodying the present invention; Fig. 2 is a cross section on the line 2 2, Fig. 1; Fig. 3 is a detail plan view of the cam, for spreading the severed friction ring; and Fig. 4 is a side elevation of the clutch operating lever and its connections.

$a$ is a wheel or pulley, in the present instance a cone pulley, loosely mounted on a shaft $b$ which projects at one end a short distance therefrom, as shown in Fig. 1. This wheel or pulley is formed or provided with an internal circular friction rim $c$ which as in the present case, may be one of the belt rims of a pulley such as is commonly mounted on the driving or main shaft of printing presses and other machines.

$d$ is a severed elastic friction ring loosely fitted within the rim $c$ of the wheel or pulley $a$ and having its hub $e$ fastened by set bolts $f$ or other means on the end of the shaft $b$, which projects from the hub of the wheel or pulley $a$. The hub of the wheel or pulley $a$ is loosely confined on the shaft $b$ between the hub $e$ of the friction ring and a collar $g$ on said shaft. The hub $e$ of the friction ring is formed or provided with a spindle or extension $h$ in line with the shaft $b$. Upon this spindle or extension is loosely mounted an axially movable coned and circumferentially grooved collar $i$, which is retained thereon by a cap or washer $j$, screwed or otherwise fastened to the end of the spindle.

In a recess or inward offset of the friction ring $d$ adjacent to its ends or the break $k$ therein, as shown in Fig. 2, is loosely fitted a cam $l$ of elliptical or oblong shape. This cam is formed with or fixed on a radial stem $m$, which is fitted to turn in bearings provided therefor in the hub $e$ and in the offset portion of the friction ring. On this stem is fixed a curved or elbow-shaped arm $n$, in the free end of which is threaded an adjusting screw $o$ projecting radially inward therefrom into the path of the coned collar $i$. This screw is securely held in place in the arm by a lock nut $p$. A spring $q$ connecting the arm $n$ with the friction ring $d$ draws the free end of the arm toward the spindle $h$ and holds the inner end of the adjusting screw $o$ in engagement with the spindle $h$ or collar $i$.

For shifting the collar $i$ and engaging and disengaging the clutch members, a lever constructed and arranged as shown in Fig. 4, is employed. This lever comprises a tubular T-shaped shank $r$, and an arm $s$ inserted and adjustably secured in the stem of the shank by a set screw $t$. The lever is fulcrumed to a floor bracket $u$ by a bolt passing through the tubular cross piece of the shank and inclined perforated ears on the bracket obliquely to the base of the bracket. The lever arm $s$ is secured by a set screw in a hub of a ring $v$ surrounding the collar $i$ and provided on opposite sides thereof with adjusting screws $w$, which pivotally engage at their inner ends with bearing blocks $x$ fitting into the groove of said collar. In line with the arm $s$ an extension or handle $y$ is secured by a set screw in a hub on the opposite side of said ring.

In setting the lever and adjusting it to a machine, the bracket $u$ is bolted or screwed to the floor or foundation on which the machine rests, the set screw $t$ is loosened, the ring $v$ is placed around the collar $i$ and the bearing blocks $s$ are adjusted by the screws $w$ in the groove of said collar, the ring $v$ being held concentric with the collar while the set bolt $t$ is tightened and the lever arm is secured in adjusted position in the shank $r$.

The collar $i$ and the shaft or spindle on which it is mounted are thus relieved from the weight of the operating lever and allowed to run free without wear.

In the operation of the clutch to lock the wheel or pulley $a$ on the shaft $b$, the operating lever is swung toward said wheel or pulley thereby thrusting the coned end of the collar $i$ between the spindle $h$ and the screw $o$ and swinging the free end of the arm $n$ outwardly from the axis of the clutch. The cam $l$ is thereby turned so as to spread or expand the friction ring $d$ into fast engagement with the rim $c$ of the wheel or pulley $a$, and the two parts are thus held by the engagement of the straight or cylindrical face of the collar $i$ with the screw $o$ without pressure on the operating lever.

To release the wheel or pulley $a$ from the shaft $b$, the lever is swung outward, thereby withdrawing the collar $i$ from engagement with the screw $o$, whereupon the spring $q$ drawing the free end of the arm $n$ inwardly, turns the cam $l$ into the position in which it is shown in the drawing and permits the friction ring $d$ to contract and release its hold in the rim $c$. By the adjustment of the screw $o$ in or out, the friction ring $d$ may be expanded more or less and caused to engage more or less tightly with the rim $c$ as may be desired, when the collar $i$ is thrust between the spindle $h$ and said screw.

Various changes in minor details of construction and arrangement of parts may be made without materially affecting the operation of the mechanism and without departing from the principle of the invention.

I claim:

1. In clutch mechanism the combination of a shaft provided with a collar, a severed expansible friction ring having a hub detachably fastened on the end of said shaft and a spindle projecting from its hub in line with said shaft, a wheel having a hub loosely mounted on said shaft between said collar and the hub of said ring and a friction rim loosely fitting over said ring, an axially movable coned collar mounted on said spindle, and a radially disposed stem provided with a cam for expanding said ring and with a bent arm projecting into the path of said coned collar.

2. In clutch mechanism the combination with a wheel having a friction rim and a shaft passing loosely through the hub of said wheel, of a severed friction ring loosely fitted within said rim and having its hub fixed on the end of said shaft and provided with a spindle in line therewith, the hub of said wheel being confined between the hub of said ring and a collar on said shaft, a cam fixed on a radial stem and loosely fitting in a recess or offset in said ring adjacent to the break therein, an axially moveable coned collar mounted on said spindle, a lever engaging said collar, an arm fixed on the cam stem and provided at its free end with a radial adjusting screw projecting into the path of said coned collar, and a spring drawing the free end of said arm toward the axis of the clutch, substantially as described.

3. In clutch mechanism the combination with the clutch shaft or spindle, of an axially movable coned collar mounted thereon, a floor bracket having separated perforated ears, a tubular lever shank having a tubular cross piece pivoted to said bracket by a bolt passing through said ears and cross piece, and a lever arm engaging said collar and adjustably secured in said shank, substantially as described.

4. In clutch mechanism the combination with the clutch shaft or spindle, of an axially movable coned collar mounted thereon, a floor bracket, a tubular lever shank pivoted to said bracket in a line oblique to its base, and a lever arm adjustably secured in said shank and engaging said collar, substantially as described.

5. In clutch mechanism the combination with a shaft or spindle and a coned and grooved collar movable axially thereon, of a ring surrounding said collar and provided on opposite sides with radially disposed screws and at right angles thereto with hubs, bearing blocks pivoted on said screws and fitting into the groove of said collar, a floor bracket having separated perforated ears, a tubular lever shank having a tubular cross piece pivoted to said bracket by a bolt passing through said ears and cross piece, an arm secured at one end in one of the hubs of said ring and adjustably secured at the other end in said tubular shank, and a handle secured in the other hub of said ring, substantially as described.

In witness whereof I hereto affix my signature in presence of two witnesses.

CHARLES R. GETHER.

Witnesses:
FRED PALM,
CHAS. L. GOSS.